US012699880B2

(12) United States Patent
Taghia et al.

(10) Patent No.: US 12,699,880 B2
(45) Date of Patent: Aug. 4, 2026

(54) DECENTRALIZED FEDERATED MACHINE-LEARNING BY SELECTING PARTICIPATING WORKER NODES

(71) Applicant: Telefonaktiebolaget LM Ericsson (publ), Stockholm (SE)

(72) Inventors: Jalil Taghia, Stockholm (SE); Farnaz Moradi, Stockholm (SE); Selim Ickin, Stocksund (SE); Konstantinos Vandikas, Solna (SE); Wenfeng Hu, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 737 days.

(21) Appl. No.: 18/011,442

(22) PCT Filed: Jun. 29, 2020

(86) PCT No.: PCT/SE2020/050678
§ 371 (c)(1),
(2) Date: Dec. 19, 2022

(87) PCT Pub. No.: WO2022/005345
PCT Pub. Date: Jan. 6, 2022

(65) Prior Publication Data
US 2023/0237311 A1 Jul. 27, 2023

(51) Int. Cl.
*G06N 3/045* (2023.01)
*G06N 3/08* (2023.01)

(52) U.S. Cl.
CPC .............. *G06N 3/045* (2023.01); *G06N 3/08* (2013.01)

(58) Field of Classification Search
CPC .................................. G06N 3/045; G06N 3/08
See application file for complete search history.

(56) References Cited

U.S. PATENT DOCUMENTS

| 2020/0027556 A1 | 1/2020 | Xie et al. |
| 2022/0353732 A1* | 11/2022 | Filippou ........... H04W 28/0289 |

FOREIGN PATENT DOCUMENTS

| WO | 2020115273 A1 | 6/2020 | |
| WO | WO-2021089429 A2 * | 5/2021 | ............. G06N 3/082 |

OTHER PUBLICATIONS

Mowla, Nishat I. et al., "Federated Learning-Based Cognitive Detection of Jamming Attack in Flying Ad-Hoc Network", Jan. 8, 2020,IEEE Access, vol. 8, p. 4338-4350 (Year: 2020).*

(Continued)

*Primary Examiner* — Haimei Jiang
*Assistant Examiner* — Thomas Bernard Lane
(74) *Attorney, Agent, or Firm* — Sage Patent Group

(57) ABSTRACT

Methods, systems, apparatuses and computer programs are presented for developing machine-learning models. A method for decentralized machine learning in a target worker node comprises: receiving a plurality of adapted neural network models from a plurality of worker nodes, wherein each of the adapted neural network models is generated by training a worker node neural network using local data of the worker node from among the plurality of worker nodes; selecting, from the plurality of adapted neural network models, a set of adapted neural network models that satisfy performance criteria when local data of the target worker node is input; and averaging the set of adapted neural network models to generate an average model.

20 Claims, 14 Drawing Sheets

(56)  References Cited

OTHER PUBLICATIONS

Roy, Abhijit Guha et al., "Brain Torrent: A Peer-to-Peer Environment for Decentralized Federated Learning", May 16, 2019, arXiv, p. 1-9 (Year: 2019).*

Kang, Jiawen et al. "Reliable Federated Learning for Mobile Networks", Apr. 2020, IEEE, p. 72-80 (Year: 2020).*

Zhoa, Yue et al., "Federated Learning with Non-IID Data", Jun. 2, 2018, arXiv, p. 1-13 (Year: 2018).*

International Search Report and Written Opinion of the International Searching Authority for PCT International Application No. PCT/SE2020/050678 dated Mar. 30, 2021.

D. Ye et al., "Federated Learning in Vehicular Edge Computing: A Selective Model Aggregation Approach," in IEEE Access, vol. 8, 2020, pp. 23920-23935.

Mowla et al., "Federated Learning-Based Cognitive Detection of Jamming Attack in Flying Ad-Hoc Network," in IEEE Access, vol. 8, 2020, pp. 4338-4350.

Roy et al., "BrainTorrent: A Peer-to-Peer Environment for Decentralized Federated Learning," ArXiv abs/1905.06731 (2019), pp. 1-9.

Zantedeschi et al., "Fully Decentralized Joint Learning of Personalized Models and Collaboration Graphs," Proceedings of the 23rd International Conference on Artificial Intelligence and Statistics (AISTATS) 2020, Palermo, Italy. PMLR: vol. 108, 23 pages.

Mohri et al., "Agnostic Federated Learning," arXiv:1902.00146v1 [cs.LG] Feb. 1, 2019, pp. 1-30.

Patarasuk et al., "Bandwidth Optimal All-reduce Algorithms for Clusters of Workstations," Department of Computer Science, Florida State University, Tallahassee, FL (2009) pp. 1-24.

Liu et al., "Client-Edge-Cloud Hierarchical Federated Learning," arXiv:1905.06641v2 [cs.NI] Oct. 31, 2019, 6 pages.

Hu et al., "Decentralized Federated Learning: A Segmented Gossip Approach," arXiv:1908.07782v1 [cs.LG] Aug. 21, 2019, 7 pages.

Paulik et al., "Federated Evaluation and Tuning for On-Device Personalization: System Design & Applications," arXiv:2102. 08503v1 [cs.LG] Feb. 16, 2021, 11 pages.

Anonymous, "Federated User Representation Learning," Under review as a conference paper at ICLR 2020, pp. 1-11.

Gao et al., "HHHFL: Hierarchical Heterogeneous Horizontal Federated Learning for Electroencephalography," arXiv:1909.05784v3 [eess.SP] Sep. 11, 2020, 7 pages.

Abad et al., "Hierarchical Federated Learning Across Heterogeneous Cellular Networks," IEEE, ICASSP 2020, pp. 8866-8870.

Anonymous, "Improving Federated Learning Personalization Via Model Agnostic Meta Learning," Under review as a conference paper at ICLR 2020, pp. 1-11.

Daily et al., "GossipGraD: Scalable Deep Learning using Gossip Communication based Asynchronous Gradient Descent," arXiv:1803. 05880v1 [cs.DC] Mar. 15, 2018, 13 pages.

Maddison, "The Concrete Distribution: A Continuous Relaxation of Discrete Random Variables," Published as a conference paper at ICLR 2017, pp. 1-20.

* cited by examiner

1b

DECENTRALIZED FEDERATED MACHINE-LEARNING BY SELECTING PARTICIPATING WORKER NODES

CROSS REFERENCE TO RELATED APPLICATION

This application is a 35 U.S.C. § 371 national stage application of PCT International Application No. PCT/SE2020/050678 filed on Jun. 29, 2020, the disclosure and content of which is incorporated by reference herein in its entirety.

TECHNICAL FIELD

Embodiments of the present disclosure relate to machine learning, and particularly methods and apparatus for developing machine-learning models.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The background section introduces aspects that may facilitate better understanding of the present disclosure. Accordingly, the statements of the background section are to be read in this light and are not to be understood as admissions about what is in the prior art or what is not in the prior art.

Conventionally, machine-learning models may be developed at a centralized network node (which may also be referred to as a master node), using a centralized data set that is available at the centralized network node. For example, a global hub of a network may comprise a global dataset that can be used to develop a global machine-learning model. Typically, a large, centralized dataset is required to train an accurate machine-learning model. Examples of nodes within networks may include base stations (such as $5^{th}$ Generation radio nodes, gNBs) and core network nodes within wired and/or wireless telecommunication networks (such as $3^{rd}$ Generation Partnership Project, 3GPP, New Radio, NR, networks).

The need for a centralized data set to train a machine learning model may be at least partially negated by employing distributed machine learning techniques. One example of a distributed learning technique is federated learning. By employing a distributed machine learning technique, a machine-learning model may be trained, or a trained model may continue to be trained, in a worker node. This further training of the machine-learning model may be performed using a dataset that is locally available at the worker node, potentially a dataset that has been locally generated at the worker node.

Distributed machine learning techniques allow updated machine-learning models to be generated at worker nodes within a network, where these updated machine-learning models have been trained using data that may not have been communicated to, and may not be known to, the master node (where the machine-learning model may have been initially trained). In other words, an updated machine-learning model may be trained locally at a worker node using a dataset that is accessible locally at the worker node, where the dataset may not be accessible elsewhere within the network (for example, at other worker nodes). It may be that the local set of data comprises sensitive or otherwise private information that is not to be communicated to other nodes within the network.

Communications network operators, service and equipment providers, are often in possession of vast global datasets, arising from managed service network operation and/or product development verification. Such data sets are generally located at a global hub. Federated learning (FL) is a potential technology enabler for owners of such datasets and other interested parties to exploit the data, sharing learning without exposing potentially confidential data.

"Federated user representation learning" by Bui, D. et. al., available at https://arxiv.org/abs/1909.12535 as of 14 May 2020, discusses Federated User Representation Learning (FURL), in which model parameters are divided into federated and private parameters. Private parameters, such as private user embeddings, are trained locally, but unlike federated parameters, they are not transferred to or averaged on a server.

"Bandwidth optimal all-reduce algorithms for clusters of workstations" by Patarasuk, P and Yuan, X, Journal of Parallel and Distributed Computing, 69(2):117-124, 2009, available at https://www.cs.fsu.edu/~xyuan/paper/09jpdc.pdf as of 14 May 2020 discusses a decentralized learning technique called All-reduce in which every worker sends the model updates to all other workers.

Conventional federated learning methods, which form an updated machine-learning model based on a simple averaging of a number of worker node versions of a machine-learning model, may not provide an optimal solution for a specific worker node. In particular, averaging versions of a machine learning model may be problematic where data from different worker nodes are highly heterogeneous (which may particularly be the case where the data relates to telecommunications) thereby leading to a model which is of lower quality. In particular, existing methods based on fine-tuning the global model according to the local data may result in a limited degree of personalization for a specific worker node.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. For the avoidance of doubt, the scope of the claimed subject matter is defined by the claims.

It is an object of the present disclosure to provide a method, apparatus and computer readable medium which at least partially address one or more of the challenges discussed above.

An aspect of the disclosure provides a method for decentralized machine learning in a target worker node. The method comprises receiving a plurality of adapted neural network models from a plurality of worker nodes, wherein each of the adapted neural network models is generated by training a worker node neural network using local data of the worker node from among the plurality of worker nodes. The method further comprises selecting, from the plurality of adapted neural network models, a set of adapted neural network models that satisfy performance criteria when local data of the target worker node is input. The method further comprises averaging the set of adapted neural network models to generate an average model.

Aspects of embodiments may provide a method for the personalized FL (federated learning) which allows a target worker node itself, rather than a master node, to select the subset of models from other workers that best explain its local data. Since the worker itself decides with whom it should federate, a natural robustness towards model poisoning is provided. Model poisoning occurs when bad data (data that intentionally or accidentally comprises incorrect data) is introduced to training data which results in divergence of a model from a correct result. The use of a model which has been trained with bad data (a poisoned model) when generating an averaged model using federated learning may result in divergence of the average model from a correct result. The method described herein may prevent a model which has been poisoned from being chosen as part of the set of models to be averaged. Also, where weighted averaging is used, a target worker identifies that the model sent by a certain worker does not fit its local data may assign a zero weight to that poisonous model, essentially discounting the poisonous model and preventing the average model from being negatively influenced by the poisonous model.

The selecting (by a net selector module) may involve enabling progressive communication cost reduction. The selecting (by the net selector module) may involve automatically deciding the subset of workers with whom the target worker should federate. As a result the communication cost is worker specific. Since the communication cost is worker-specific, this can be used for the pricing of the subscription offerings for worker nodes within a network. For example, a plurality of workers may subscribe to a federation, but each worker may not benefit equally from the subscription—some workers may benefit more than others. An example is where local data of a given worker is of poor quality. In such a scenario, by joining the federation this worker would potentially benefit more than other workers which have high quality local data. A worker with poor quality local data benefits from communicating with many other workers whereas a worker with high quality local data would not benefit as much from communicating with many other workers. Since the communication cost is worker specific in such cases, the provider of the federation can charge the workers based on the number of communications with other workers.

Furthermore, the worker itself may set a budget for communication cost. As a result, by joining the federation, the upper bound of the subscription pricing may be determined by the worker itself. The worker may then expect to be charged less or equal to this upper bound.

The target worker node may request the plurality of adapted neural network models from the plurality of worker nodes. The request for the plurality of adapted neural network models may be sent to the plurality of worker nodes; and/or the request for the plurality of adapted neural network models may be sent to a master node.

By sending the request directly to the other worker nodes, communications between nodes may be reduced.

The performance criteria may be satisfied when a value of a loss function or a performance metric determined for an adapted model is greater than a threshold value. The performance criteria may be based on the target worker performance determined when the local data of the target worker node is processed by a neural network of the target worker node.

The selecting may comprise determining a performance value for each of a plurality of combinations of adapted neural network models, and selecting the combination of adapted neural network models with the performance value that best satisfies the performance criteria as the set of adapted neural network models.

The selection of the set of adapted models may be performed using a net selector neural network. The decentralized machine learning may be federated learning.

A neural network layer of a worker node neural network and a neural network layer of the neural network of the target worker node may use the same neural network architecture.

Aspects of embodiments may offer personalization at the layer level of the neural network, which results in a layer-wise federation. For example, at two arbitrary layers of the neural network (which may share the same architecture), two different subsets of workers may federate with each other. These subsets may be chosen automatically in a fully data driven approach by the net selector module.

An aspect of the disclosure provides a method for decentralized machine learning in a system comprising a plurality of worker nodes. The method comprises a first target worker node of the plurality of worker nodes performing the method outlined above. The method also comprises a second target worker node of the plurality of worker nodes receiving the plurality of adapted neural network models, which comprises the average model of the first target worker node, from the plurality of worker nodes. The method also comprises selecting, from the plurality of adapted neural network models, a set of adapted neural network models that satisfy a performance criteria when local data of the second target worker node is input. The method also comprises averaging the set of adapted models to generate a further average model.

A process in which each of the worker nodes of a plurality of nodes perform the method of selecting and averaging to generate an average model may result in improved personalization for each worker node as well as improving the models of other worker nodes with similar data.

An aspect of the disclosure provides a target worker node comprising a receiver configured to receive a plurality of adapted neural network models from a plurality of worker nodes, wherein each of the adapted neural network models is generated by training a worker node neural network using local data of the worker node from among the plurality of worker nodes. The target worker node also comprises a net selector module configured to select, from the plurality of adapted neural network models, a set of adapted neural network models that satisfy performance criteria when local data of the target worker node is input. The target worker node also comprises a model averaging module configured to average the set of adapted models to generate an average model.

An aspect of the disclosure provides a system comprising a plurality of worker nodes, wherein the plurality of worker nodes comprises the target worker node. The system may further comprise a master node.

An aspect of the disclosure provides a computer program comprising instructions which, when executed on at least one processor, cause the at least one processor to carry out the method described herein.

An aspect of the disclosure provides a computer program product comprising non transitory computer readable media having stored thereon the computer program.

BRIEF DESCRIPTION OF THE DRAWINGS

For a better understanding of the present invention, and to show how it may be put into effect, reference will now be made, by way of example only, to the accompanying drawings, in which:

FIG. 2A(ii) is a block diagram illustrating the components of a system involving master-free federated learning;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Examples of the present disclosure provide methods for using federated learning to develop a machine learning model. The methods introduce the concept of selecting a set of adapted neural network models trained by different worker nodes that satisfy performance criteria of a target worker node based on local data of the target worker node. In some examples, the combination of adapted neural network models which achieve the best performance relative to the neural network model of the target worker node given local data of the target worker node may be found and selected. The selected set of neural network models can then be averaged to generate an average model, which may replace the current neural network model of the target worker node. The averaging model may include, as an input, the current neural network model of the target worker node, in addition to the selected combination. By combining the neural network models that satisfy the performance criteria of the target worker, the neural network model of the target worker may be improved and communication cost may be reduced. The performance criteria may be at least partly based on finding a set with the lowest number of adapted neural network models required to achieve a value of a loss function or a performance metric above a threshold value. The performance criteria may be satisfied when a value of a loss function or a performance metric determined for a set of adapted neural network models is greater than a threshold value.

For the purposes of this disclosure, a target worker node is a worker node in which the processes outlined herein may be implemented. It should be appreciated that any worker node of the system may be a target worker node, and that more than one worker node may be a target worker node. In some aspects of embodiments, each worker node of the system may act in turn as a target worker node.

Figure 1A:
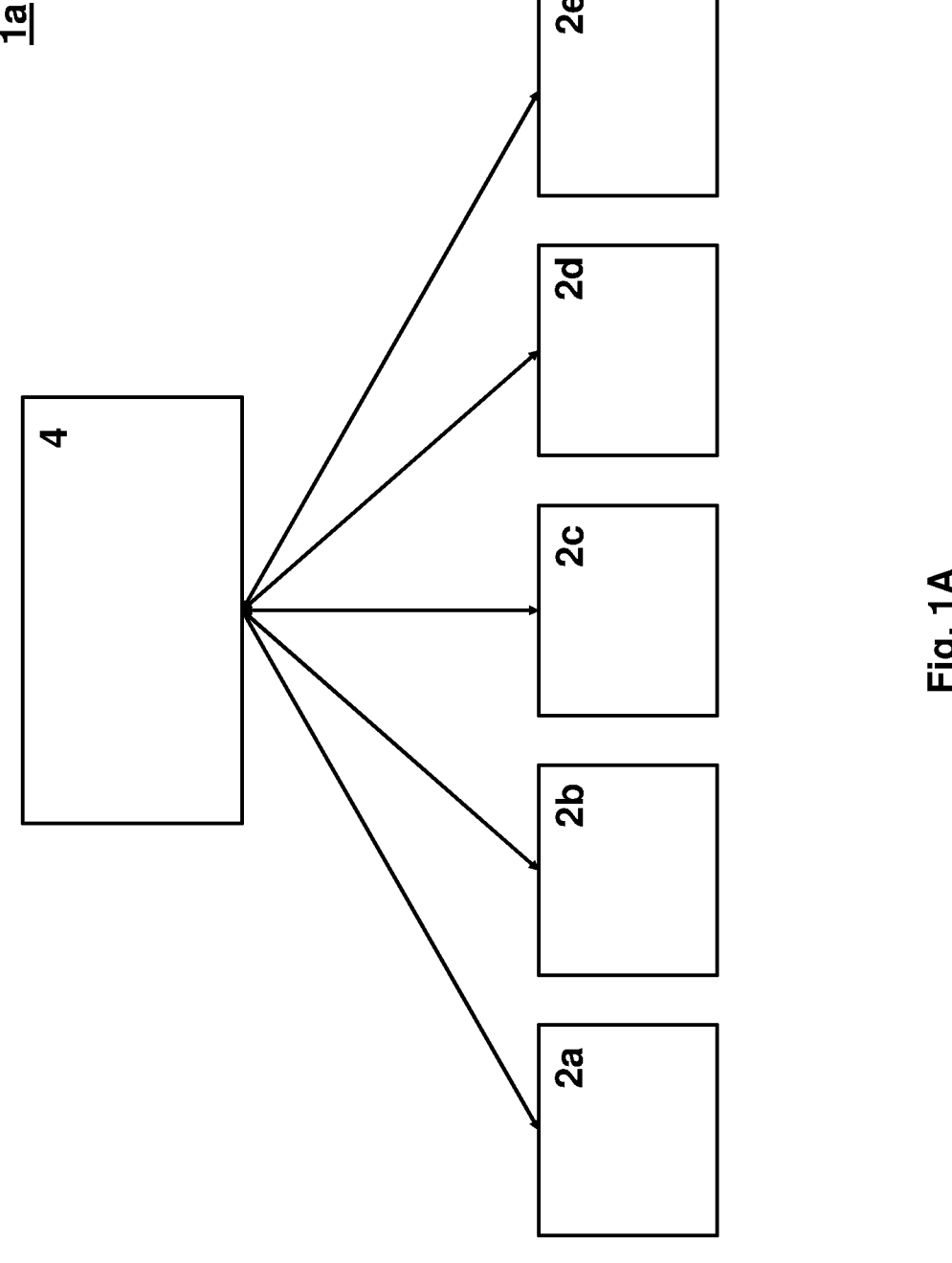
FIG. 1A is a block diagram of a system illustrating master based federated learning.

FIG. 1A illustrates a system in which the methods and processes described herein may be used. In particular, FIG. 1A. shows a system 1a in which decentralized machine learning (federated learning) may be performed. This Figure in particular illustrates an example of master-based machine learning, where a master node 4 communicates with a plurality of worker nodes 2a-2e.

Figure 1B:
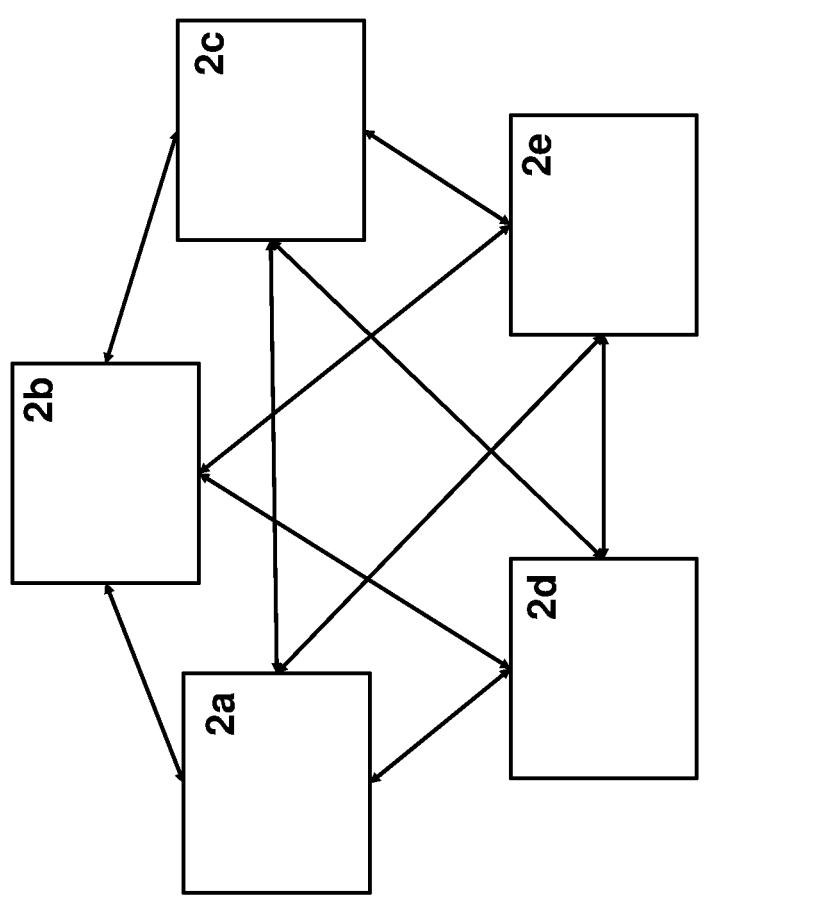
FIG. 1B is a block diagram of a system illustrating master free federated learning.

FIG. 1B illustrates an alternative system 1b in which decentralized machine learning (federated learning) may be performed. FIG. 1B illustrates an example of master-free machine learning, where a master node is not required, and instead each of a plurality of worker nodes 2a-2e communicate (directly) with one another.

It will be appreciated that, even in a system where a master node is provided, the worker nodes may communicate directly with one another and may perform the methods and processes described herein in relation to master-free machine learning.

Figure 1C:
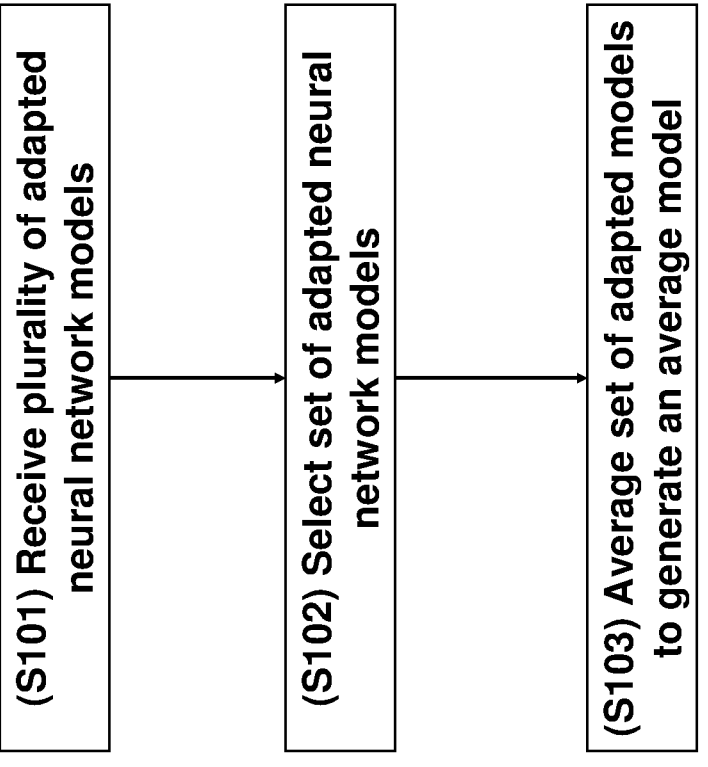
FIG. 1C is a flow diagram illustrating learning method in a target node.

FIG. 1C illustrates a method at a target worker node. As is illustrated in this Figure, the method involves the steps of receiving a plurality of adapted neural network models (e.g. receiving neural network parameters) (step S101), selecting a set of adapted neural network models (step S102), and averaging the set of adapted models to generate an average model (step S103).

The method may involve a neural network being adopted by all worker entities (nodes) of a system (e.g. federated worker nodes of a system). Preferably the same neural network (a generic neural network model, for example) is adopted by all the worker nodes of the system, although different neural networks may also be used by worker nodes within the system. Each worker node trains a neural network model using their own local data and a neural network (which may be the same neural network at each worker node) to generate an adapted neural network model.

A neural network comprises a plurality of layers, wherein a layer is a collection of 'nodes' of a neural network operating together at a specific depth within the neural network. Each neural network of the worker nodes may comprise an identical architecture (wherein all the layers of a worker node are the same as the equivalent layers in another worker node), or one or more individual layers of the neural networks of the worker nodes may share an identical architecture (with one or more other layers being non-identical). For example, assume there are two workers, A and B. Worker A has a neural network with $L_A$ layers and worker B has a neural network with $L_B$ layers. Among the layers of the workers' neural networks, there are L consecutive layers ($L<L_A$ and $L<L_B$) that have identical architectures. In this case, worker A and worker B can federate with each other using the L layers that they have in common. Thus, a set of adapted neural network models may be selected for the layers that the workers have in common. Sharing identical architecture may improve training time of the neural network model.

The local data of a worker node or a target worker node may be at least one of: Quality of Service (QoS) data such as QoS performance counter dataset collected on the network elements (such as the worker nodes) used in key performance indicators related to activity, throughput, latency, mobility, coverage level, etc, a dataset containing the event logs of a worker node (e.g., system or equipment errors, faults, alarms, and events), a configuration of the worker node, etc, data logs of resource usage such as CPU, memory, etc.

The average model may be used for estimating or predicting KPI degradation related to QoS such as call quality, network throughput or latency; predicting hardware or software failures in advance; predicting site failures, estimating anomalies in the network elements, etc., sleeping cell detection and SLA violation prediction.

A worker node acting as a target worker node then requests the adapted models (e.g., neural network parameters) from all or a subset of workers. The request may be sent either to a master node (in the case of master-based federated learning (FL)) or directly to the other worker nodes in the system (in the case of master-free FL). Even in systems where a master node is present, the worker node may communicate directly with the other worker nodes. The use of the term "directly" does not require that no other components may be involved in the communication, on the contrary communication may be routed via other components such as relay nodes if necessary. The use of the term "directly" to describe a communication requires only that communication is not routed via the master node.

The target worker node then receives the requested models either from the master node (in the case of master-based FL) or directly from the worker nodes in the system (in the case of master-free FL). Even in systems where a master node is present, the other worker nodes may send the requested models directly to the target worker node.

The target worker node then uses a net selector module (comprising a net selector neural network) to select a subset of models that best explains its local data. For example, the net selector module may select, from the plurality of adapted neural network models, a set of adapted neural network models that satisfy performance criteria when local data of the target worker node is input. The net selector module may use a neural network model to determine which set or sets of adapted neural network models satisfy performance criteria. That is, the net selector neural network model may generate an output by analysing the effectiveness of different combinations of the adapted neural network models and determining which combinations provide good results. In particular, the net selector module may select a combination of adapted neural network models from among the plurality of adapted neural network models which, when combined, achieve the best performance from among the combinations of adapted neural network models tested. The net selector module may use any type of performance metric to determine whether the performance criteria is fulfilled. For example, the performance criteria may be satisfied when a value of a loss function and/or a performance metric determined for an adapted model is greater than a threshold value. A performance value may be determined for each of a plurality of combinations of adapted neural network models, and the combination of adapted neural network models with the performance value that best satisfies the performance criteria may be selected as the set of adapted neural network models. The performance criteria may be based on a performance value of the adapted neural network model of the target worker node determined when local data of the target worker node is input to the adapted neural network model of the target worker node, for example, the performance value may be the value of a loss function or other performance metric.

Each worker applies averaging on the selected models. The averaging may include averaging the adapted model of the target worker node as well as the set of adapted models. The averaging may be done per layer of the neural network of the target worker node following the federation of common layers of neural networks of worker nodes; this option may be referred to as layer-wise federation or layer-wise federated learning.

The averaging may be weighted averaging, where the weighting of each model is determined by the net selector module. The average of the set of adapted neural network models and the adapted model of the target worker node may be taken, where the weighting of the adapted model of the target worker node may also be determined by the net selector module. The weighting may be based on the performance criteria. A combination of both the performance as determined by the performance criteria and the communication cost may be considered as the final metric to provide a weighting for each model for producing the average model.

Each worker may send the (weighted) average model to either the master (in the case of master-based FL) or directly to any other workers from whom it receives a request (in the case of master-free FL). As explained above, even in systems where a master node is present, the worker node may communicate directly with the other worker nodes.

Figure 2A:
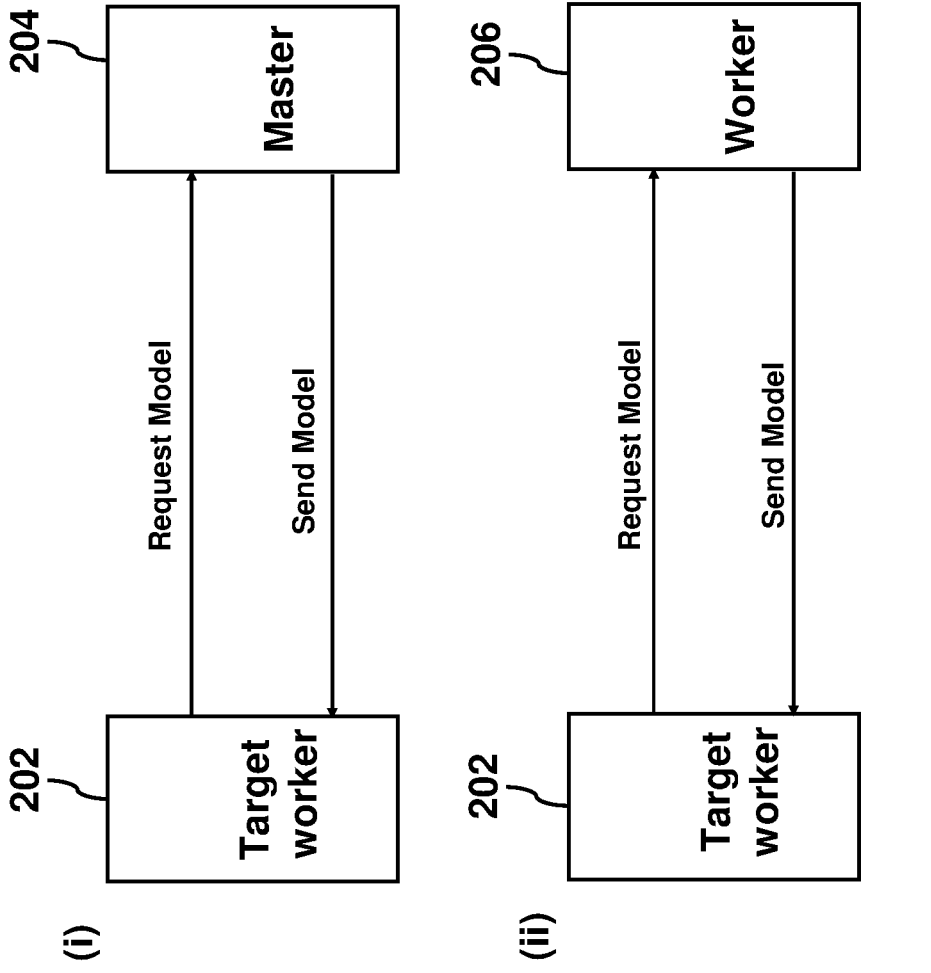
FIG. 2A(i) is a block diagram illustrating the components of a system involving master-based federated learning.

FIG. 2A illustrates two example systems in which the method outlined above may be used. Each of the systems comprise a plurality of worker nodes, wherein the plurality of worker nodes include a target worker node 202 (only the target worker node 202 is shown). In the example of FIG. 2A(i), the method involves a target worker node 202 sending a request for the adapted models of a plurality of worker nodes (not shown) to a master node 204 (master-based FL). The master node 204 sends the target worker node 202 the models of the plurality of worker nodes requested by the target worker node 202. In the example of FIG. 2A(ii), the method involves a target worker 202 sending a request for an adapted model to at least one worker node 206. The request may be sent to a plurality of worker nodes. The worker node 206 sends its adapted model to the target worker node 202 (one worker node is shown here as an example, however, the target worker node 202 may send the request and receive an adapted model from a plurality of worker nodes). Thus, the target worker node 202 may receive a plurality of adapted models from a master node

204, or from a plurality of worker nodes 206. For example, each of a plurality of worker nodes 206 may send their respective adapted model. It will be appreciated that the examples described herein may either comprise a system which incorporates a master node which acts as an intermediary between the worker nodes, where the worker nodes communicate with the master node (only) (referred to herein as master-based FL), or a system in which the worker nodes communicate directly with one another (and therefore may have no need for a master node) (referred to herein as worker-based FL).

Figure 2B:
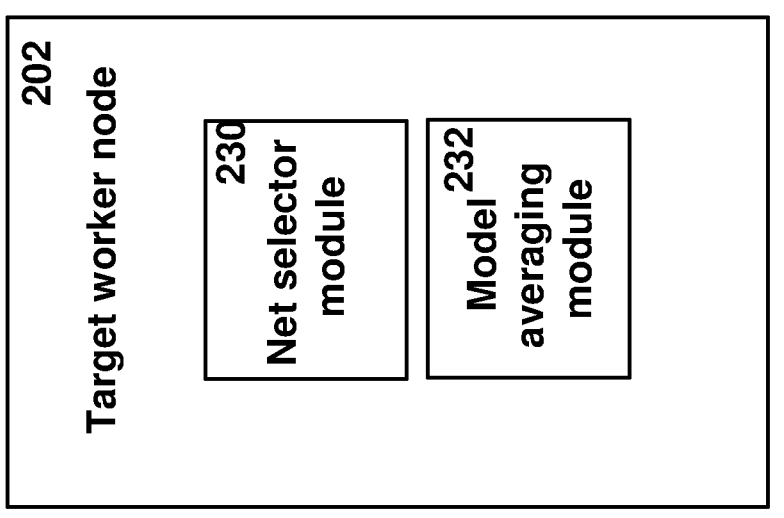
FIG. 2B is a block diagram of a target worker node apparatus.

The target worker node is illustrated in the block diagram of FIG. 2B, where the target worker node B comprises a net selector module 230 to select the set of adapted neural network models, and a model averaging module 232 to average the set of adapted models.

Figure 2C:
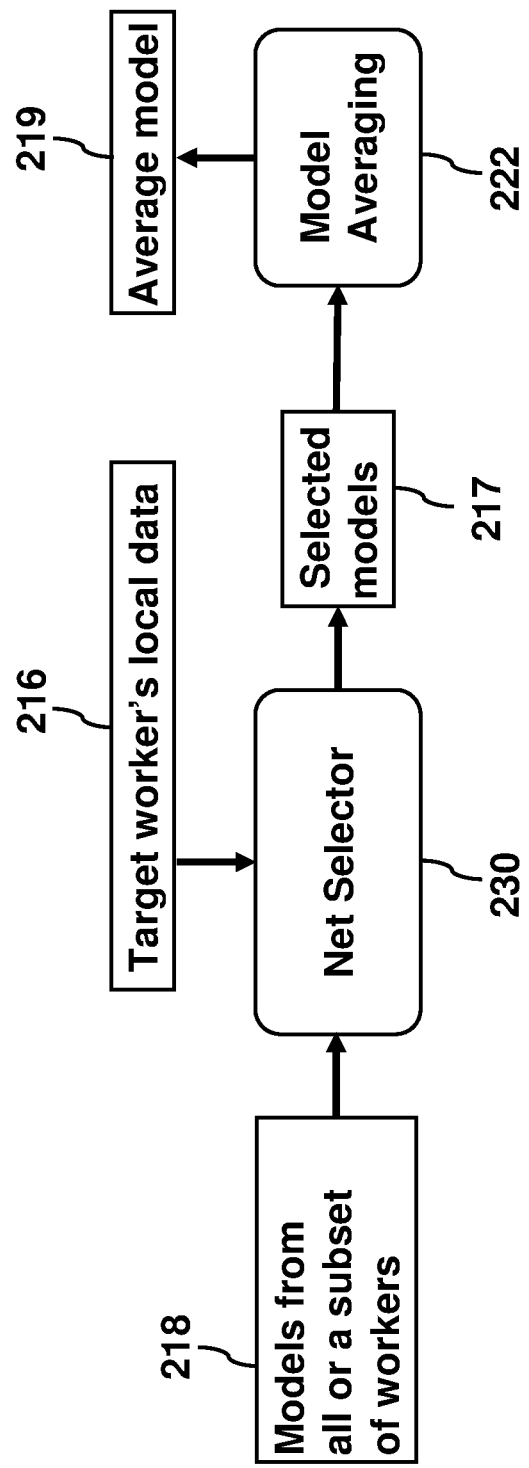
FIG. 2C is a block diagram illustrating the flow of data in a target worker node.

The flow of data in a target worker node is illustrated in FIG. 2C. As is illustrated in the block diagram of FIG. 2C, the at least one adapted neural network mode model 218 received from all or a subset of workers is input to a net selector module 230 of the target worker node 212. Local data of the target worker node 216 is also input to the net selector module 230. The net selector module then selects a set of the adapted neural network models 217 which have been input. The models are selected on the basis of whether they satisfy performance criteria, e.g. whether they best suit the local data of the target worker node 216. The models selected by the net selector module 230 are fed into a model averaging module 222 of the target worker node 212 which performs averaging of the models, either a simple averaging or weighted averaging, for example, and produces an average model 219. In a subsequent step, the average model may be sent to the master node (as in the case of FIG. 2A(i) or a worker node from which a request for the model of the target worker has been received (the case of FIG. 2A(ii)).

The net selector module described herein may comprise a net selector neural network which uses CONCRETE latent variables (continuous relaxation of discrete random variables) and a CONCRETE distribution, which is a family of distributions with closed form densities and a simple reparameterization. An example of the use of CONCRETE latent variables and a CONCRETE distribution are outlined in "The concrete distribution: A continuous relaxation of discrete random variables" by Maddison, C et al., ICLR, 2017, available at https://arxiv.org/abs/1611.00712 as of 14 May 2020.

As is described above, the net selector module takes as inputs both the local data of the target worker node and the local trainer model of the target worker node, as well as adapted models from all (or a subset of) other workers nodes. The net selector module then selects a set or subset of local trainer models which achieves the best performance on the worker node's local data. The performance may be measured in terms of the same criterion used in the target worker's local trainer. The criterion used may be a value of a loss function or a performance metric.

The net selector neural network model may be constructed as follows: Let $\tau = \{1, \ldots, M\}$ indicate the set of M worker nodes. Furthermore, let Z be a (K×M) matrix of latent variables:

$$Z = \begin{bmatrix} z_1 \\ z_2 \\ \vdots \\ z_K \end{bmatrix} = \begin{bmatrix} [z_1]_1 & [z_1]_2 & \cdots & [z_1]_M \\ [z_2]_1 & [z_2]_2 & \cdots & [z_2]_M \\ \vdots & \vdots & \ddots & \vdots \\ [z_K]_1 & [z_K]_2 & \cdots & [z_K]_M \end{bmatrix}, \qquad \text{Eq. 1}$$

where $[z_i]_j$ indicates the j-th element of the vector $z_i$. The latent variable matrix Z is assumed to comprise CONCRETE latent variables with a CONCRETE distribution meaning that initially each is a continuous variable;

$$\sum_i [z_k]_i = 1, [z_k]_j \in (0, 1); \qquad \text{Eq. 2}$$

and at the end of learning, each approaches a one-hot discrete variable (e.g. tends towards a limit value, where the limits may in an exemplary embodiment be 0 and 1);

$$[z_i]_{j*} \to 1, [z_k]_j \to 0, \forall j^* \neq j. \qquad \text{Eq. 3}$$

Let $\mathcal{S} = \{1, \ldots, K\}$ be set of K workers, and $$\underline{W}_j^{(l)} = \left\{ W_i^{(l)} \right\}_{i \in \mathcal{S} \setminus j}$$

denote the set of models from all other worker nodes at a given layer 1 for the j-th worker node. The net selector neural network of L layers takes on the following form:

$$\begin{cases} h^{(1)} = f^{(1)}\left(\left(\pi_j^{(1)} W_j^{(1)} + \sum_{k \in \mathcal{S}} \pi_k^{(1)}(z_k^{(1)} \odot \underline{W}_j^{(1)})\right)x\right), & \text{Eq. 4} \\ h^{(2)} = f^{(2)}\left(\left(\pi_j^{(2)} W_j^{(2)} + \sum_{k \in \mathcal{S}} \pi_k^{(2)}(z_k^{(2)} \odot \underline{W}_j^{(2)})\right)h^{(1)}\right), \\ \quad \vdots \\ y^{(L)} = f^{(L)}\left(\left(\pi_j^{(L)} W_j^{(L)} + \sum_{k \in \mathcal{S}} \pi_k^{(L)}(z_k^{(L)} \odot \underline{W}_j^{(L)})\right)h^{(L-1)}\right), \end{cases}$$

where $f^{(l)}$ indicates a chosen activation function at layer l. In the above equation, the latent variable Z is distributed according to a CONCRETE distribution, that is $$z_k^{(l)} \sim \text{CONCRETE}( ), \text{ and } \pi_k^{(l)} = P\left(z_k^{(l)} = 1\right).$$

As is described above, the net selector neural network model takes as inputs the adapted models and local data of the target worker node and processes these inputs using the net selector neural network model outlined above to determine a set (or combination) of adapted models that performs adequately (preferably best compared to other sets or combinations) given the local data of the target worker node. As an example, Z is a vector with elements which sum to 1. During training this vector approaches a one-hot vector where only a single element of this vector approaches 1 and every other element of the vector approach 0. The learning may be stopped when the single element approaching 1 reaches a threshold value. This threshold value may be close to 1, for example, the learning may be stopped when the single element of this vector reaches a value greater than 0.98 (the value of 0.98 is an exemplary confidence value which would provide sufficient confidence about the selection). The threshold may be a value close to 1, however, the closer the threshold is to a value of 1, the longer the training would require for the model to converge. Therefore, the threshold value is selected to balance the time for training with the confidence of the selection.

The communication cost for a worker node may be determined by the net selector module. For example, consider a system (federation) of a number of workers where the local trainer of each worker is a neural network of L layers and $N_l$ units. The communication cost for the worker j at R rounds of federation is given by:

$$\text{cost}_j = \sum_{r=1}^{R} \sum_{l=1}^{L} K_{r,l}^{j} N_l \qquad \text{Eq. 5}$$

where $$K_{r,l}^{j}$$

is the size of the subset of models selected by the net selector of the worker node j at layer l and at round r of the federation.

The communication cost is worker node specific as the cost for worker j depends on $$K_{r,l}^{j}$$

which may be (automatically) determined by the net selector module of the worker node j at layer l. The net selector module may therefore consider the communication cost of a worker node when selecting the set of adapted models. Thus, the communication cost of a worker node may be reduced. For example, each worker may set a budget on the communication cost per layer. The net selector of the target worker may take this budget into account for each layer of the neural network when selecting the adapted models. The maximum number of adapted models per layer may be bounded by the budget assigned by the target worker.

Figure 3:
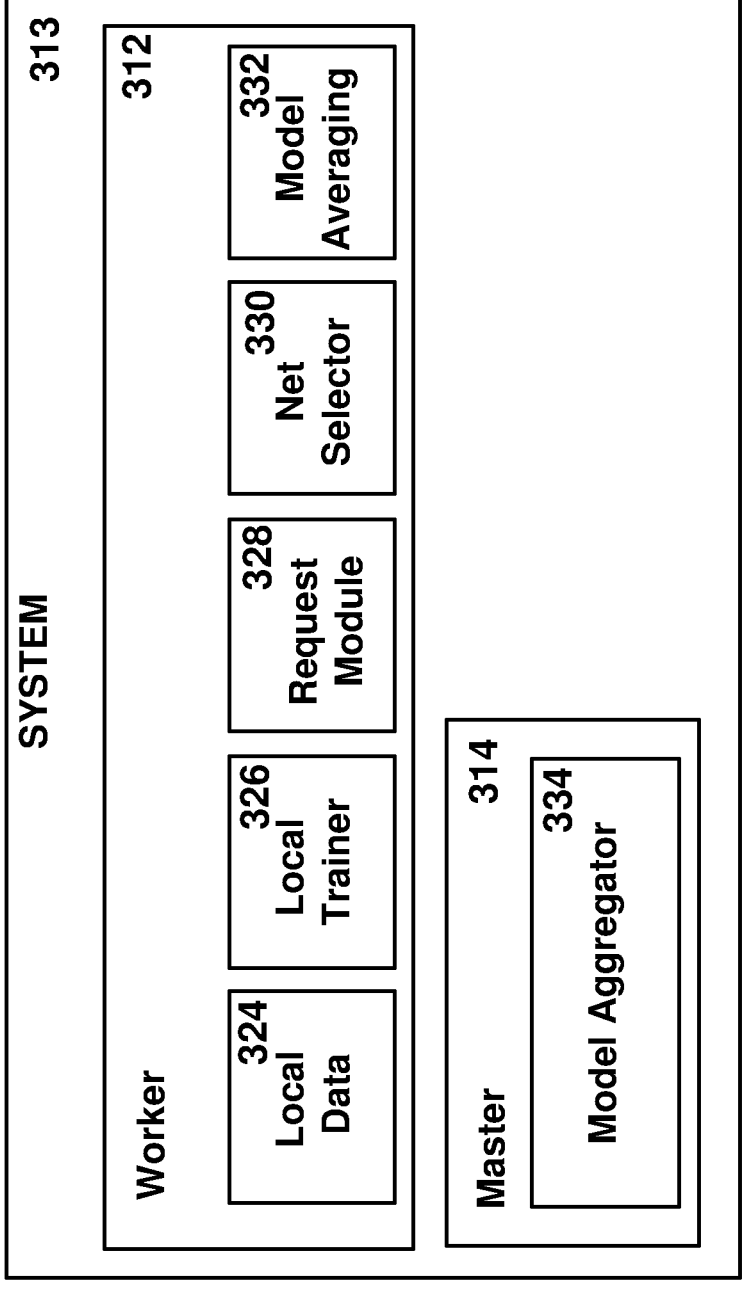
FIG. 3 is a block diagram illustrating the components of a system involving master-based federated learning.

A further example of the embodiment of FIG. 1A is shown in FIG. 3, which illustrates the modules comprised in a target worker node 312 and a master node 314 in a system which comprises a plurality of worker nodes (only the target worker node is shown in this example) and a master node. As can be seen in this Figure, the target worker node comprises a local data module 324 which comprises local data of the target worker and/or collects training data from the infrastructure (such as a local data center), a local trainer module 326 which comprises an arbitrary neural network predictive model such as a classifier or a regressor to be trained using the local data of the target worker, a request module 328 for receiving worker IDs from the net selector module and requesting their corresponding models from other workers or the master node 314, a net selector module 330 (as described above), and a model averaging module 332 for averaging the set of models selected by the net selector module 330. The master node 314 comprises a model aggregator module 334 which collects the models sent by the worker nodes.

Figure 4:
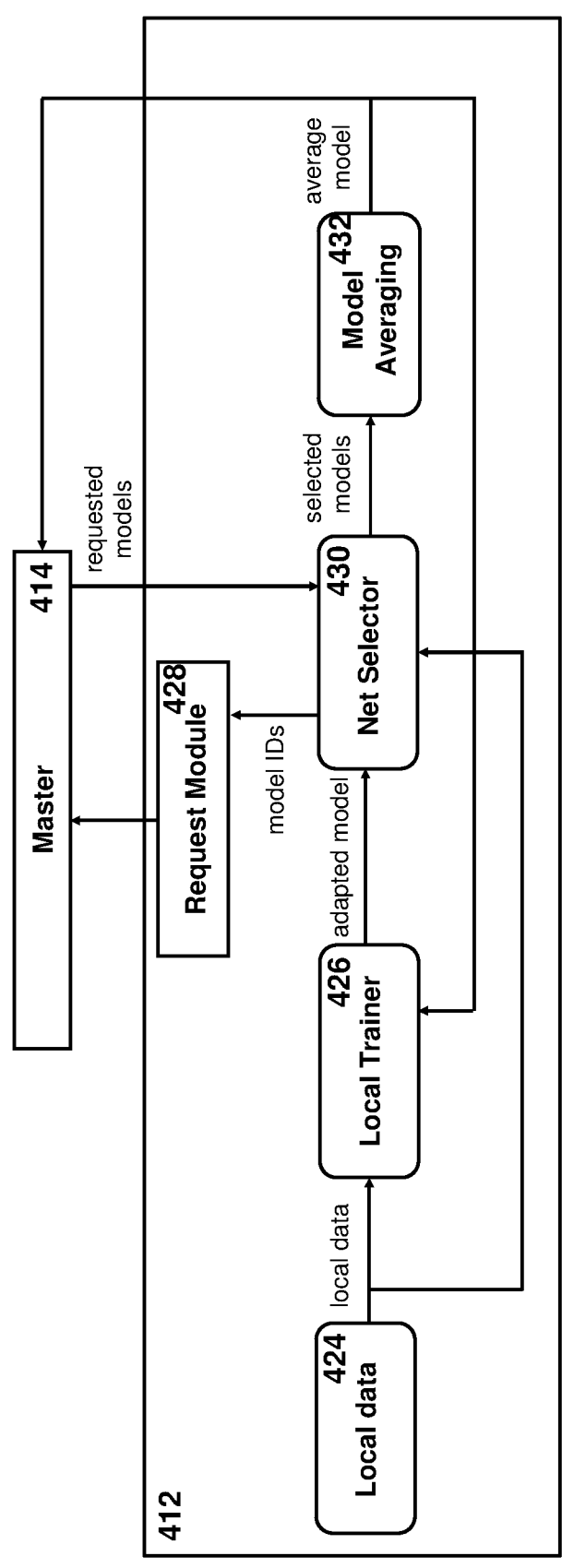
FIG. 4 is a block diagram illustrating training in a single round of federation in master-based federated learning.

FIG. 4 illustrates the processes that occur between the target worker node and master node illustrated in FIGS. 3 and 1A. As is illustrated in FIG. 4, local data of the target worker node 412 is sent from the local data module 424 to the local trainer module 426. The local trainer module 426 uses the local data to train a neural network to generate an adapted neural network model. The adapted neural network model is then sent to the net selector module 430. The local data of the target worker node 412 is also sent to the net selector module 430. The net selector module 430 requests a plurality of models from the master node 414. In this example, the net selector module 430 sends the IDs of the models from a previous round of federation to the request module 428, where the request module 428 then requests the relevant models from the master node 414. In another example, the net selector module may request all or a subset of models of worker nodes in the network from the master node 414 (via the request module or directly). The master node 414 then sends the models that have been requested to the net selector module 430. The models received by the net selector module 430 from the master node 414 are adapted neural network models, where each of the adapted neural network models has been generated by training a worker node neural network using local data of the worker node.

The net selector module 430 then uses the adapted model of the target worker node, the local data of the target worker node and the adapted models received from the master node 414 to select a set of neural network models that satisfy performance criteria when local data of the target worker node is input.

The set of models which satisfy the performance criteria are then sent to the model averaging module 432 where the models (for example, the models of the worker nodes and the model of the target worker node) are averaged to generate an average model. The average model is then sent to the master node 414. The adapted model of the target worker node is updated with the average mode.

Figure 5:
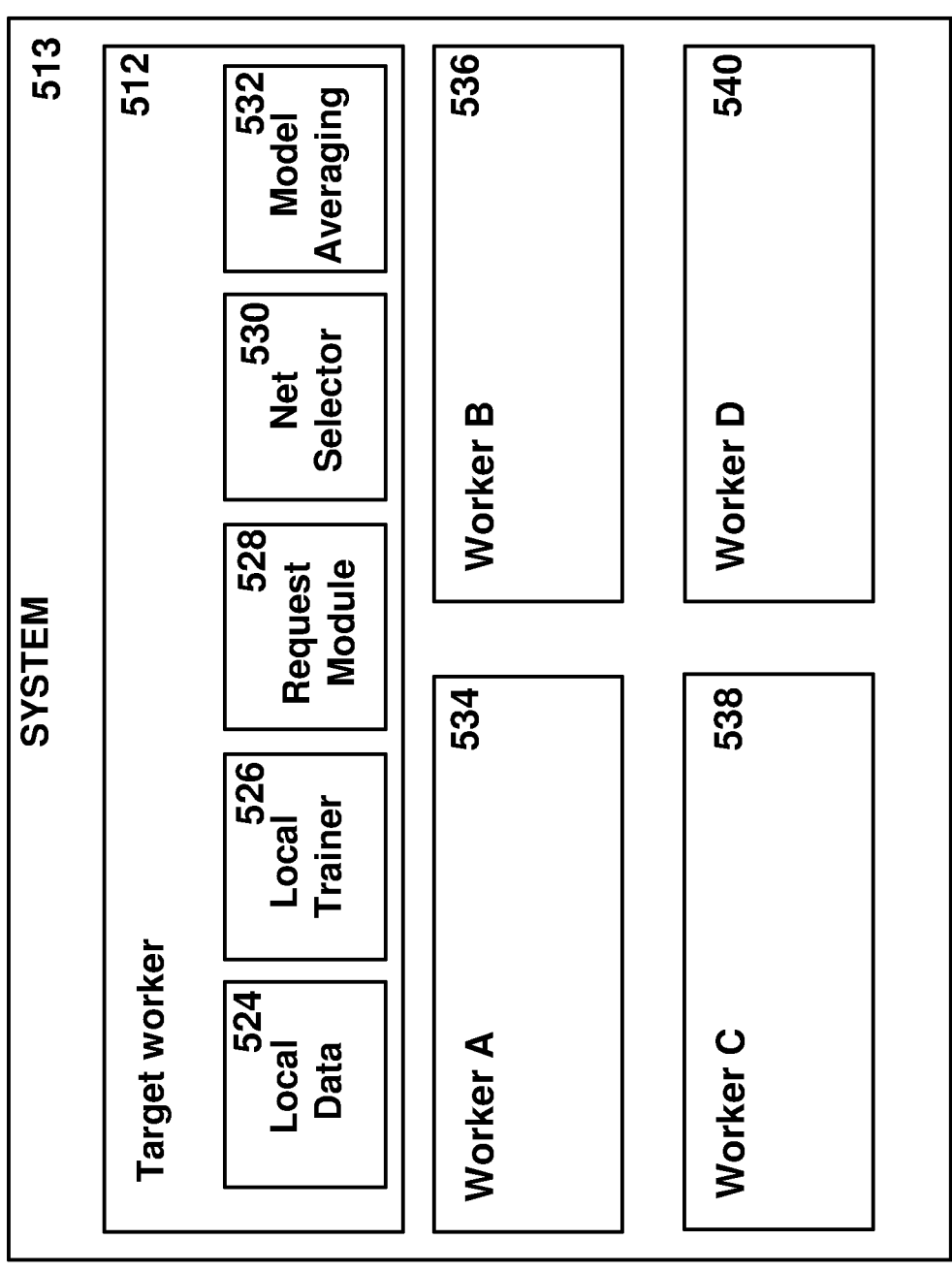
FIG. 5 is a block diagram illustrating the components of a system involving master-free federated learning.

FIG. 5 shows an alternative example to that illustrated in FIGS. 3 and 1A. The example shown in FIG. 5 does not require a master node as the worker nodes communicate directly with one another. The system 513 comprises a plurality of worker nodes including a target worker node along with worker nodes A-D. The target worker node 512 shown in FIG. 5 has the same configuration as the target worker node of FIG. 3 (e.g. the target worker node comprises a local data module 524, a local trainer module 526, a request module 528, a net selector module 530 and a model averaging module 532). Each of the plurality of workers (worker node A 534, worker node B 536, worker node C 538 and worker node D 540) may also have the same configuration as the target worker node, and may be configured to perform the same machine learning functions as the target worker node.

Figure 6:
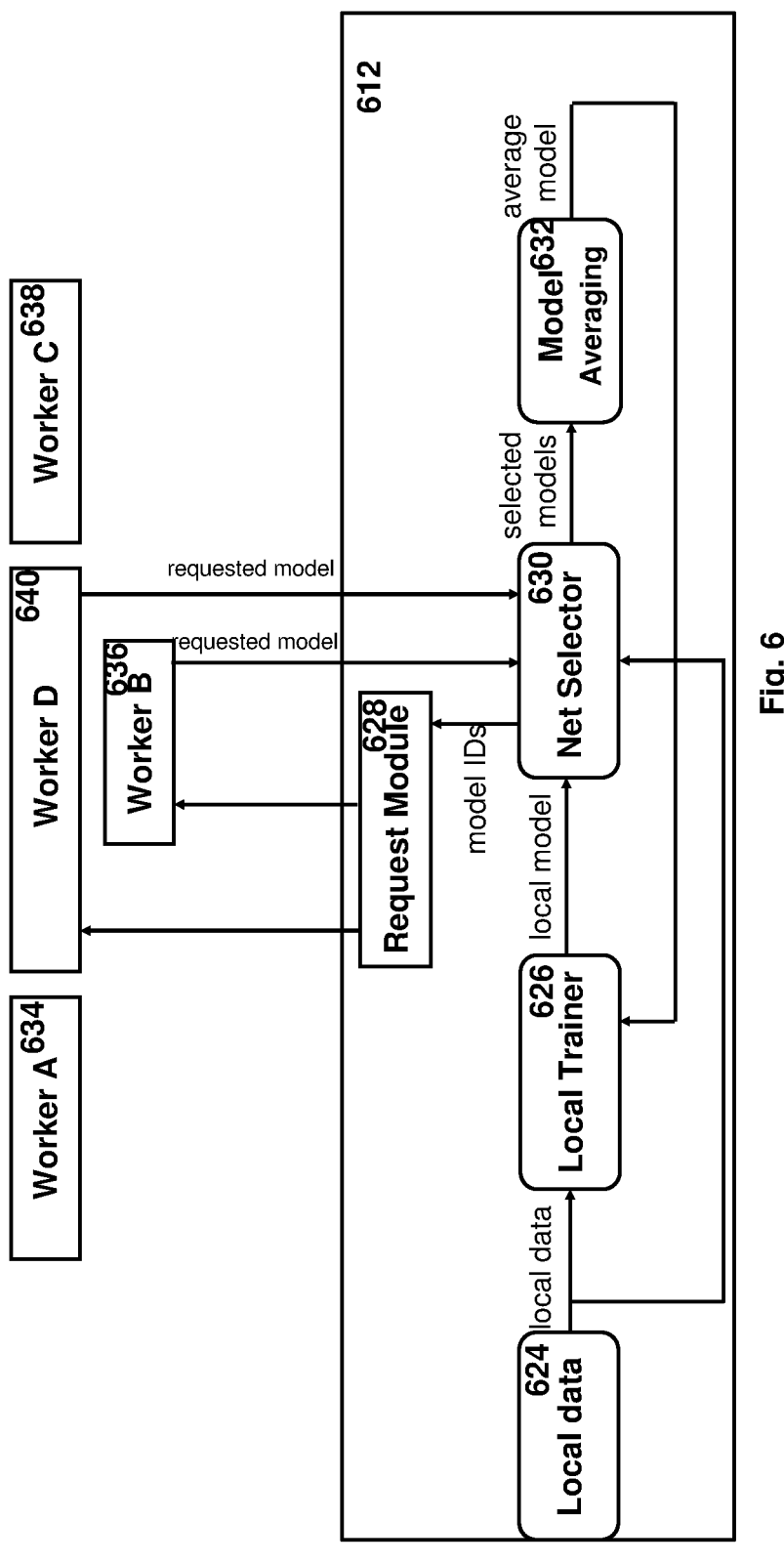
FIG. 6 is a block diagram illustrating training in a single round of federation in master-free federated learning.

FIG. 6 illustrates the processes that occur between the target worker node 612 and worker node A 634, worker node B 636, worker node C 638 and worker node D 640. The processes are the same as those shown in FIG. 4, except that the requests for models are sent directly to the relevant worker node (via the request module), and each worker node sends their requested model directly to the net selector module 630.

In this example, the worker models to be input to the net selector module are the models of the worker node B 636 and the worker node D 640. The request module 628 sends a request for the model of worker node D 640 to worker node D 640. The model of worker node D is an adapted model where the model has been trained using local data of worker node D. Worker node D sends its adapted model to the net selector module 630 of the target worker node 612. The request module 628 also sends a request for the model of worker node B 636 to worker node B 636. The model of worker node B 636 is an adapted model where the model has been trained using local data of worker node B 636. Worker node B 636 sends its adapted model to the net selector module 630 of the target worker node 612. Thus, the net selector module 630 receives an adapted neural network model of worker node B, and an adapted neural network model of worker node D. It will be appreciated that the request may be sent to any number of worker nodes, and the target worker node may therefore receive any number of adapted neural network models.

The net selector module performs the same process explained in relation to FIG. 4. In particular, the net selector module 630 uses the adapted model of the target worker node, the local data of the target worker node and the models received from worker node B 636 and worker node D 620 to select a set of neural network models that satisfy performance criteria when local data of the target worker node is input.

The set of models which satisfy the performance criteria (e.g. the model of worker node B 636) are then sent to the model averaging module 632 (along with the local model of the target worker node) where the models are averaged to generate an average model. The averaging may include averaging the adapted model of the target worker node as well as the set of adapted models. The adapted model of the target worker node 612 is updated with the average model by sending the average model to the local trainer module 626.

As is described above, FIG. 4 illustrates an example of training in a single round of federation in master-based FL, and FIG. 6 shows an example of training in a single round of federation of master-free FL. The steps required for an example implementation including further rounds of federation are described in more detail below.

Step.0 (Initialization): In the example systems of FIGS. 4 and 6 each of the worker nodes of the plurality of worker nodes comprise the same neural network architecture with identical initialization at their respective local trainer module. Each worker node locally trains a neural network based on its own local data using the local trainer to generate an adapted neural network model. In the case of master-based FL, for example as shown in FIG. 4, each worker node sends their adapted neural network model to the master node.

Step.1 (First round of federation): Once the federation starts all worker nodes are informed with a broadcast configuration file either stating that the federation is fully decentralized and providing a dictionary of IP addresses and port numbers of each accessible worker in the federation, or that the worker nodes are in federation with a master node and providing just the IP address and port of the master node. In the case of the master-based FL such as that shown in FIG. 4, the net selector module of the target worker node requests from the master node all other workers' models or a subset of randomly selected workers. In the case of master free FL such as that shown in FIG. 6, the net selector module sends a separate request to all worker nodes in the system using the request module asking for their adapted models. Upon receiving all the requested models, the net selector module of the target worker node uses these models together with the local data of the target worker node, and then automatically selects a set, or subset, of models that best suits the target worker. For example, all the adapted neural network models may be selected or a subset of the adapted neural network models may be selected. The size of this subset may be determined as described above in relation to the net selector module. The selected models are averaged by the model averaging module (the averaging can be a simple averaging or weighted averaging). The local trainer module is updated with the resulting average model. Thus, the average model becomes the adapted model of the target worker node. In the case of the master-based FL, the average model is sent to the master node.

The net selector module may determine a set of adapted models that satisfy the performance criteria at each layer of the neural network. Thus, the net selector neural network may be applied separately to each layer of the adapted neural network models. In this case, the selected subset of workers by the net selector across various layers of the neural network may differ.

Step.2 (Further rounds of federation): The process may be repeated in other rounds of federation, where the results of the previous rounds may influence the subsequent rounds. For example, in the case of the master-based FL, the net selector module of the target worker node requests only a subset of adapted worker node models from the master node. The requested subset of adapted worker node models is the same subset of adapted models identified from the previous round of federation by the net selector module. In the case of master free FL the net selector module of the target worker node requests models from the subset of workers identified from the previous round of federation via the request module. Upon receiving all the requested models, the net selector module of the target worker node uses these adapted models together with the local data, and then automatically selects a set of models that best suits the target worker. The size of this subset may be determined automatically in a data-driven fashion by the net selector module. The selected models are averaged by the model averaging module (the averaging can be a simple averaging or weighted averaging). The local trainer module is updated by the resulting average model. Thus, the average model becomes the adapted model of the target worker node. In the case of the master-based FL, the average model may be sent to the Master.

Again, the net selector module may be applied separately to each layer of the adapted neural network models. In this case, the selected subset of adapted neural network models by the net selector across various layers of the neural network may differ.

Step 1 may be repeated after a pre-defined round of federation.

Figure 7:
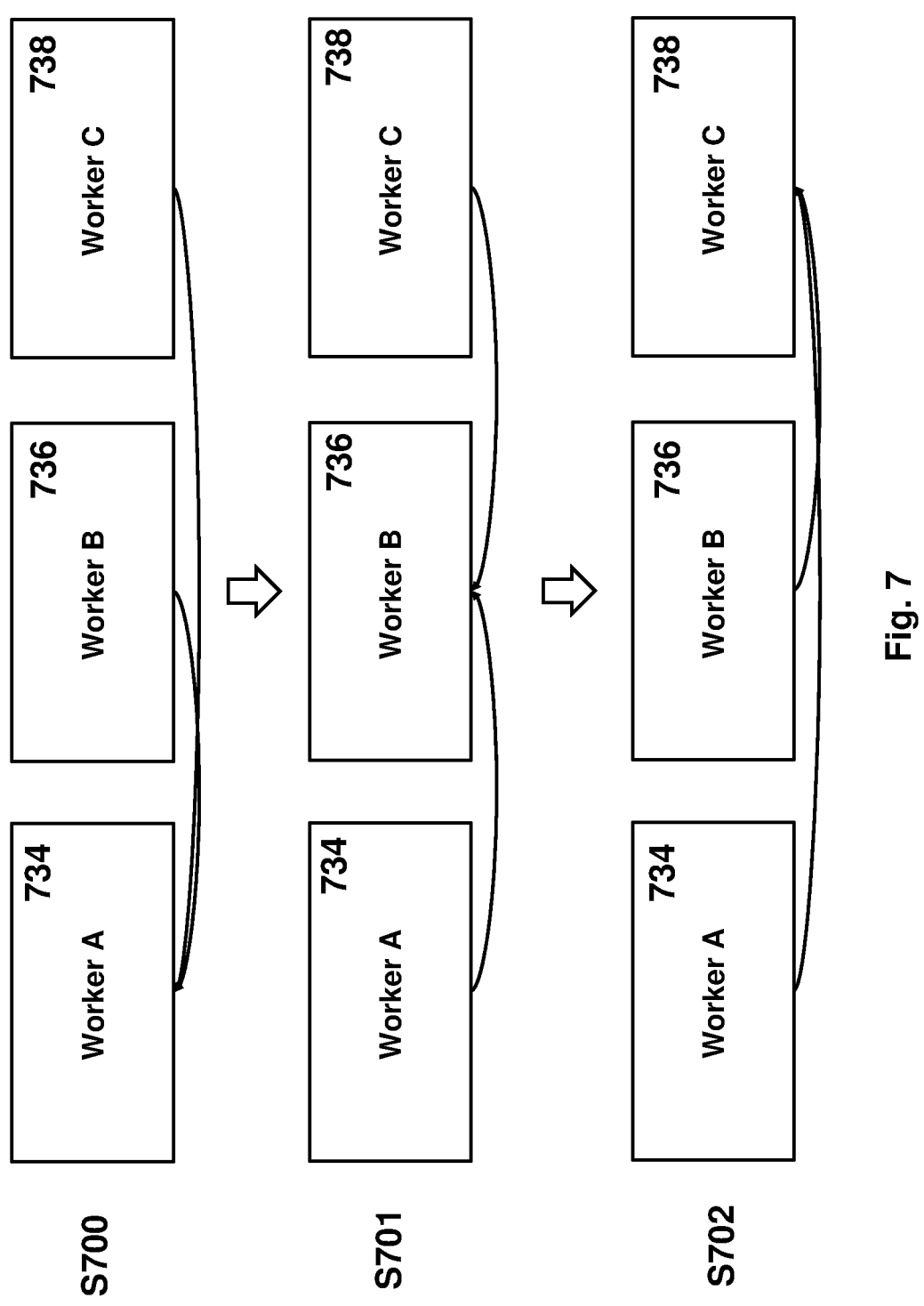
FIG. 7 is a block diagram illustrating the interaction between a plurality of worker nodes.

FIG. 7 illustrates an example iterative process by which the worker nodes of a system comprising a plurality of worker nodes each perform the process outlined above. For example, initially, in step 700 (S700) the target worker node is worker node A 734, which performs the processes outlined above and receives adapted neural network models from worker nodes B 736 and C 738. Worker node A selects a set of adapted neural network models from the adapted neural network models of worker nodes B 736 and C 738, and produces an average model, which becomes the adapted neural network model of worker node A. In a subsequent step, step 701 (S701), worker node B is the target worker node. The worker node B receives adapted neural network models from worker nodes A 734 and C 738 (note that, in this sequence, the adapted neural network model received from worker node A 734 is the average model generated in step 700). The processes described above are performed and worker node B produces an average model which becomes the adapted neural network model of worker node 2. In step 702 (S702), the processes is similarly repeated, whereby worker node C is the target worker node and receives adapted neural network models from worker nodes A 734 and B 736 (the adapted models in this case are the average models of worker nodes A and B generated in the previous steps). The processes described above are similarly performed by worker node C and worker node C produces an average model which becomes the adapted neural network model of worker node C.

It will be appreciated that such a system may also comprise a master node which acts as an intermediary between the worker nodes, whereby the processes shown in FIG. 7 may be performed by sending requests and models via a master node rather than directly between the worker nodes.

Figure 8:
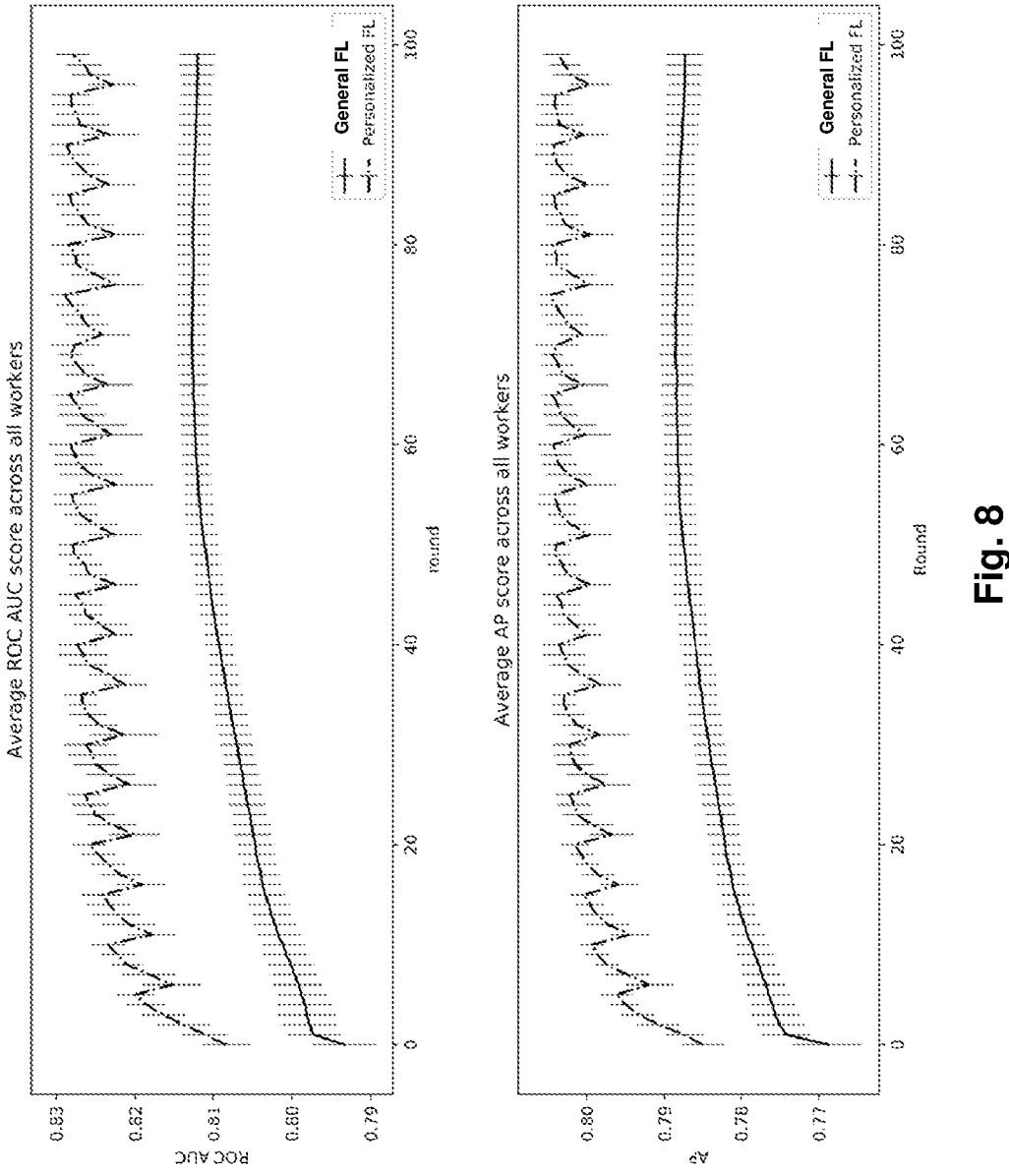
FIG. 8 is a graph illustrating the difference between the models resulting from a standard process for federated learning (general federated learning (FL)) and the processes outlined herein (personalized federated learning (FL))
Figure 9:
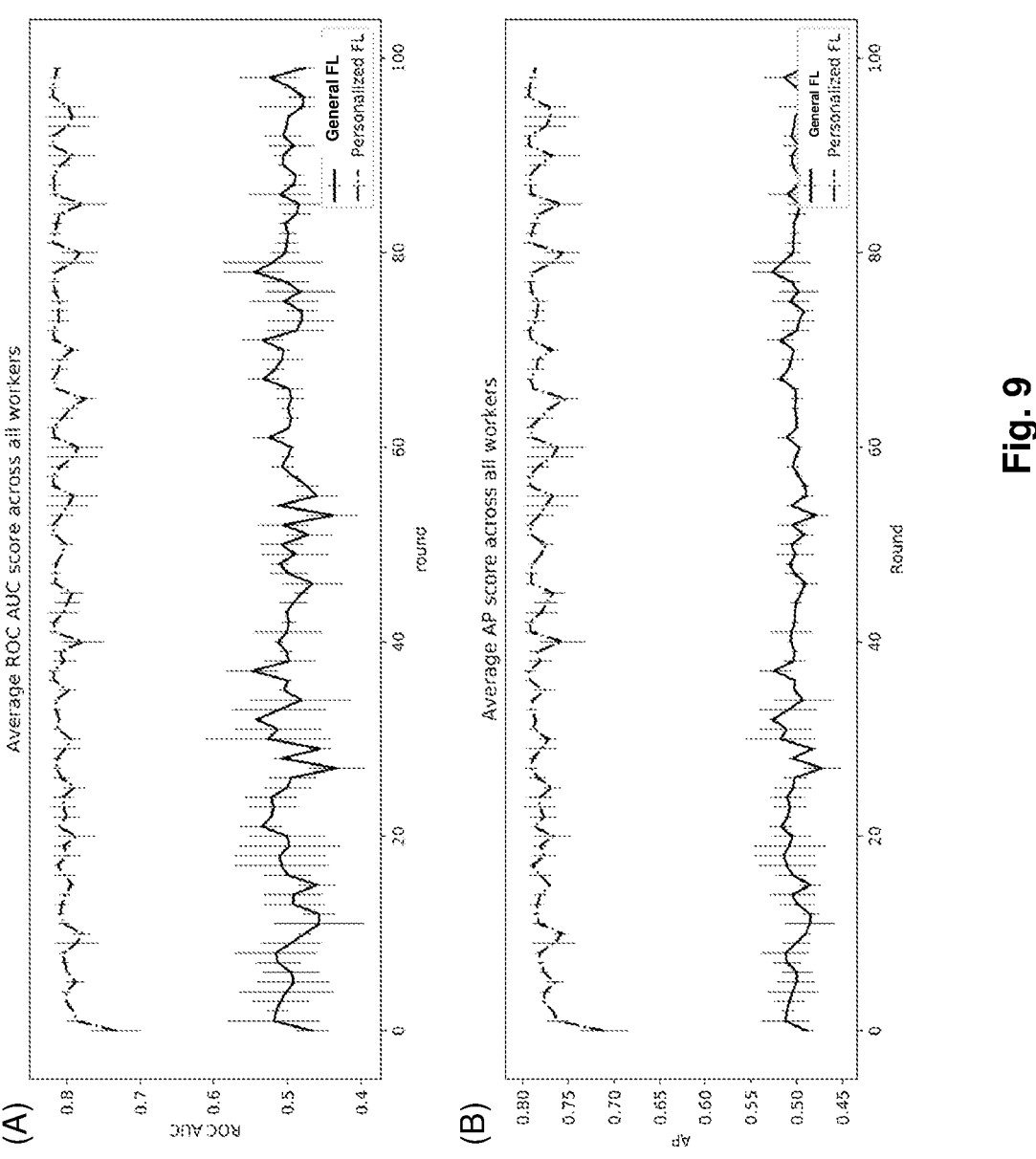
FIG. 9 is a graph illustrating the difference between the models resulting from a standard process for federated learning (general federated learning (FL)) and the processes outlined herein (personalized federated learning (FL)) when the system is attacked.

FIGS. 8 and 9 illustrate the performance difference between an example model resulting from a standard process for federated learning (FL) (general federated learning, also known as vanilla federated learning) and the processes outlined herein (which are referred to as personalized federated learning (FL)).

A standard process for federated learning may involve worker nodes locally training a machine learning model in the form of a neural network on their local data and sending the (partially or fully) optimized models (neural network parameters) to the master node. The master node then performs averaging on the collected models from all workers. The average model is sent back to the worker nodes.

In contrast, as is described herein, the personalized federated learning involves receiving a plurality of adapted neural network models from a plurality of worker nodes, wherein each of the adapted neural network models is generated by training a worker node neural network using local data of the worker node from among the plurality of worker nodes, selecting, from the plurality of adapted neural network models, a set of adapted neural network models that satisfy performance criteria when local data of the target worker node is input and averaging the set of adapted neural network models to generate an average model. Thus, the model is personalized for the target worker.

In a first example experiment (where the results are illustrated in FIG. 8), a system comprises sixteen worker nodes and a master node. The two methods (the general federated learning and personalized federated learning) are performed by the system and the resulting models are compared against one another. The models used in each method comprise similar initializations that include: an identical neural network architecture as their predictive model (consisting of 4 layers), the same optimizers, the same stopping criteria (how many iterations can be run before a learner begins to over-fit), and the same random seed (initialization state of a pseudo random number generator). Both methods are run for 100 rounds of federation, and 5 epochs (the number of passes through the entire training dataset the machine learning algorithm has completed) per round. The experiment is repeated for 20 runs.

In this example, the case of a binary classification problem is considered. The local data of each worker node are divided into two sets, train and test. All models are trained on the train set and evaluated on the test set. The accuracy is evaluated in terms of Area Under the Receiver Operating Characteristic Curve (ROC AUC) and Average Precision (AP) scores.

FIG. 8 illustrates the results of this example experiment. The evaluation metrics, ROC AUC and AP, are reported in terms of the mean values across all workers. The error bar shows the standard deviation across 20 independent runs of the experiment. The solid line indicates the general FL and the dotted line indicate the proposed personalized FL with progressive cost reduction. For example, in early rounds of federation, a target worker may not be confident as to which workers comprise the most appropriate set. The target worker node is therefore required to communicate with many workers. However, as the federation continues, the confidence of the target worker as to which workers to select may improve, and therefore the target worker may automatically select fewer workers with which to communicate. AP and ROC AUC are normalized scores between 0 and 1, with 1 being the highest score and 0 being the lowest score. As is evident from FIG. 8, the personalized FL shows an improvement compared to the general FL, as the scores of the personalized FL are closer to 1 than those of the general FL.

In a second example experiment, the setup is the same as in the first example experiment. Thus, the system comprises sixteen worker nodes and a master node. The two methods (the general federated learning and personalized federated learning) are performed by the system and the resulting models are compared against one another. The models used in each method comprise similar initializations that include: an identical neural network architecture as their predictive model (consisting of 4 layers), the same optimizers, the same stopping criteria, and the same random seed. Both methods are run for 100 rounds of federation, and 5 epochs per round. The experiment is repeated for 20 runs.

However, in the second experiment, the effectiveness of an attack on the system for federated learning (general federated learning) and the processes outlined herein (personalized federated learning) are evaluated.

To simulate an attack on the system, at least one worker node in the system randomizes its neural network parameters (weight matrices and bias vectors) and applies a Gaussian random noise before sending its adapted neural network model to a target worker node. In this simulation, four worker nodes of the sixteen worker nodes are set up to simulate an attack.

The result the second experiment is shown in FIG. 9. The evaluation metrics, ROC AUC (A) and AP (B), are reported in terms of the mean values across all workers. The error bar shows the standard deviation across 20 independent runs of the experiment. The solid line indicates the general FL and the dotted line indicate the proposed personalized FL with progressive cost reduction as explained above. AP and ROC AUC are normalized scores between 0 and 1, with 1 being the highest score and 0 being the lowest score. As is illustrated in FIG. 9, the personalized FL is more effective than the general FL in handling attacks (gives a score closer to 1), and thus the personalized FL provides better results.

This result may be achieved by the removal of models which would otherwise skew the resulting average model by having incorrect neural network parameters. By selecting a set of adapted neural network models that satisfy performance criteria when local data of the target worker node is input, any set that includes a model that skews the result will not be selected, and thus the resulting set selected by the net selector module would not include an attacker. Thus, the method provides robustness against model poisoning.

To improve privacy in a federated learning system an additional protocol such as secure aggregation may be employed. Secure aggregation allows for computation using a dataset of a worker node to take place in a different worker node without allowing the dataset of the worker node to be disclosed to the different worker node. In order to ensure that each worker node does not access another worker node's dataset despite a target worker node receiving an adapted neural network model of a worker node, a secure enclave may be directly connected to each worker node's network interface controller (NIC), or a point at which each worker node interfaces with, or receives communications from, another worker node. As such, data from other worker nodes may be received by the target worker node, for example, but the target worker node that receives the data is not able to read it. Only the process running within the secure enclave may read the data. Therefore, processes that determine a set of adapted neural network models that satisfy the performance criteria as described above may be performed within the secure enclave.

Figure 10:
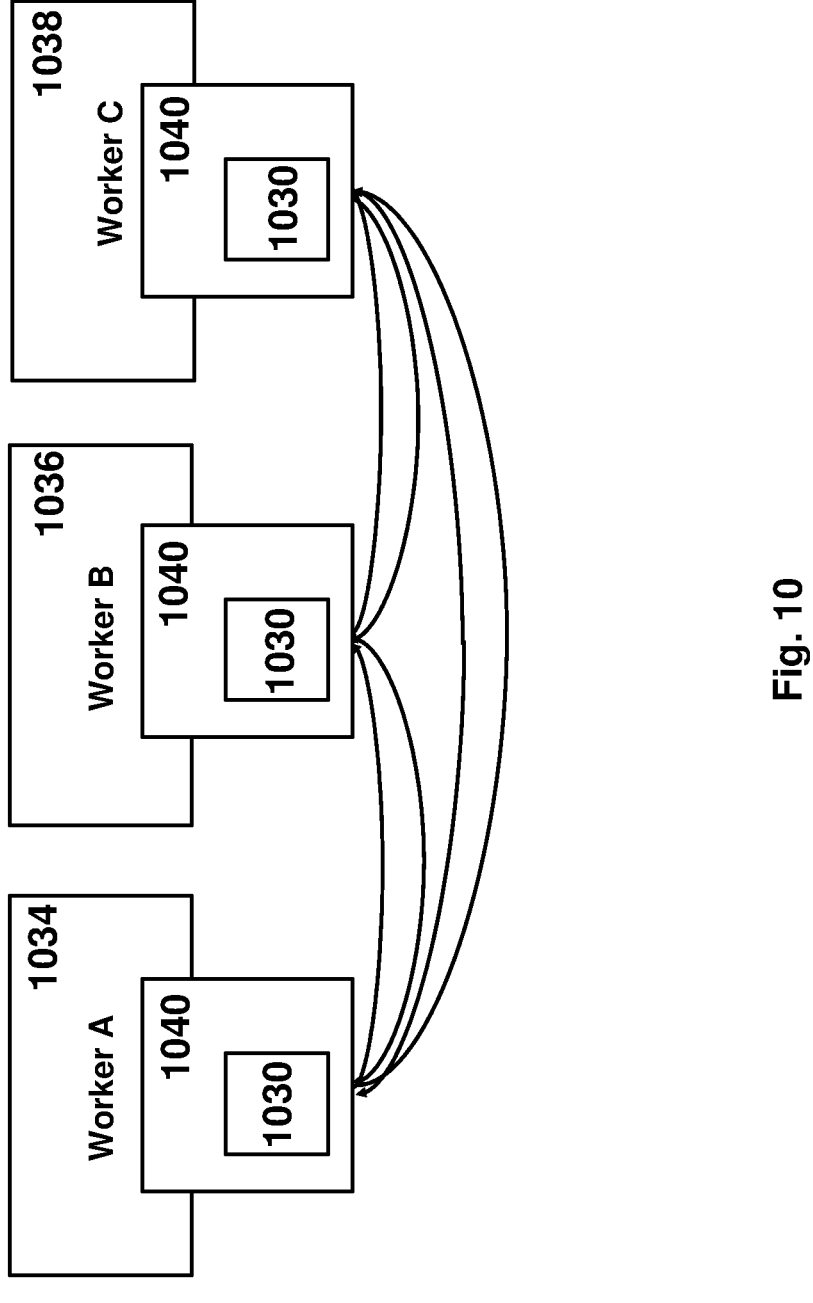
FIG. 10. is a block diagram of an example using a secure enclave.

FIG. 10 illustrates a block diagram of an example using a secure enclave. In this example, worker node A 1034, worker node B 1036 and worker node C 1038 are each connected to a secure enclave 1040 in which a net selector module 1030 is located, in a master-free system where each worker node may communication with another worker node in the system. Each of the worker nodes A, B and C perform the processes of the target worker node outlined above. The processes described above involving the net selector module 1030 may therefore be performed in a secure enclave. Thus, models requested from another worker node may processed in the secure enclave 1040, so that this data cannot be read by a target worker node. Similarly, in a master-based system, the worker nodes may be configured in the same way, where each worker node is connected to a secure enclave in which a net selector module is located, and through which communication with a master node may be received. Thus, models requested from the master node may be received in the secure enclave.

The set of models selected by the net selector module may be communicated from the secure enclave of a worker node to its model averaging module. Alternatively, the model averaging module may be provided in the secure enclave, and the average model may be communicated from the secure enclave of a worker node to its local trainer module.

It will be appreciated that while this example only describes the net selector module as being provided in the secure enclave 1040, any of the processes described herein may be performed in the secure enclave. For example, the model averaging module (and thus the model averaging), the request module, the local trainer module and/or the local data module may be provided in the secure enclave. Each worker node may comprise different modules within the secure enclave and perform different processes in their respective secure enclaves.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure. For the avoidance of doubt, the scope of the disclosure is defined by the claims.

The invention claimed is:

1. A method for decentralized machine learning in a target worker node of a plurality of worker nodes, the method comprising:
   receiving a plurality of adapted neural network models from the plurality of worker nodes, wherein each of the adapted neural network models is generated by training a worker node neural network using local data of a worker node from among the plurality of worker nodes;

selecting, by the target worker node, from the plurality of adapted neural network models, a set of adapted neural network models that satisfy performance criteria based on processing the local data generated at the target worker node using the plurality of adapted neural network models; and averaging, by the target worker node, the set of adapted neural network models to generate an average model that becomes an adapted neural network model of the target worker node.

2. The method as claimed in claim 1, wherein the target worker node requests the plurality of adapted neural network models from the plurality of worker nodes.

3. The method as claimed in claim 2, wherein:

the request for the plurality of adapted neural network models is sent to the plurality of worker nodes; or the request for the plurality of adapted neural network models is sent to a master node.

4. The method as claimed in claim 1, wherein each of the plurality of adapted neural network models is received at the target worker node from the respective worker node from among the plurality of worker nodes.

5. The method as claimed in claim 4, wherein the adapted neural network models are received at the target worker node via a master node.

6. The method as claimed in claim 1, wherein the performance criteria is satisfied when a value of a loss function or a performance metric determined for an adapted model is greater than a threshold value.

7. The method as claimed in claim 1, wherein the performance criteria is based on the target worker performance determined when the local data of the target worker node is processed by a neural network of the target worker node.

8. The method as claimed in claim 1, wherein the selecting comprises determining a performance value for each of a plurality of combinations of adapted neural network models, and selecting the combination of adapted neural network models with the performance value that best satisfies the performance criteria as the set of adapted neural network models.

9. The method as claimed in claim 8, wherein the averaging comprises weighted averaging, and wherein a weighting used for each of the set of adapted neural network models in the weighted averaging is based on the performance value.

10. The method of claim 1 wherein, prior to processing any data, each of the plurality of worker nodes and the target worker node uses the same generic neural network model as a starting point.

11. The method as claimed in claim 1, wherein a neural network layer of a worker node neural network and a neural network layer of the neural network of the target worker node use the same neural network architecture.

12. The method as claimed in claim 11, wherein a set of adapted models is selected for the neural network layer.

13. The method as claimed in claim 11, wherein the averaging is performed for the neural network layer.

14. The method as claimed in claim 1, further comprising applying the average model to a neural network of the target worker node.

15. The method as claimed in claim 1, further comprising sending the average model to a master node or to a worker node.

16. The method as claimed in claim 15, wherein the target worker node sends the average model when a request for the average model has been received by the target worker node.

17. The method as claimed in claim 1, wherein the selection of the set of adapted models is performed using a net selector neural network.

18. The method as claimed in claim 17, wherein the net selector neural network uses concrete latent variables with a concrete distribution.

19. The method as claimed in claim 1, wherein the selecting is performed in a secure enclave of the target worker node.

20. The method as claimed in claim 1, wherein the set of adapted neural network models is selected based on a communication cost of each worker node of the plurality of worker nodes.

*   *   *   *   *